United States Patent [19]

Schmukler et al.

[11] Patent Number: 4,477,532
[45] Date of Patent: Oct. 16, 1984

[54] COMPOSITE STRUCTURES

[75] Inventors: Seymour Schmukler, Palatine; John Machonis, Jr., Schaumburg; Mitsuzo Shida, Barrington, all of Ill.

[73] Assignee: Chemplex Company, Rolling Meadows, Ill.

[21] Appl. No.: 493,798

[22] Filed: May 12, 1983

Related U.S. Application Data

[60] Continuation-in-part of Ser. No. 313,638, Oct. 22, 1981, abandoned, which is a division of Ser. No. 178,355, Aug. 15, 1980, abandoned.

[51] Int. Cl.$^3$ .................. B32B 17/10; B32B 15/08; C08L 23/06; C08L 23/10
[52] U.S. Cl. .................. 428/441; 156/242; 156/244.11; 156/334; 264/299; 427/180; 427/385.5; 428/461; 428/475.8; 428/476.1; 428/476.3; 428/508; 428/509; 428/512; 428/513; 428/516; 428/520
[58] Field of Search .................. 525/74, 78; 428/461, 428/441, 509, 508, 512, 513, 475.8, 476.1, 476.3, 520, 516; 427/180, 385.5; 156/334, 244.11, 242; 264/299

[56] References Cited

U.S. PATENT DOCUMENTS

| 3,658,948 | 4/1972 | McConnell | 525/74 |
| 3,746,676 | 7/1973 | Joyner et al. | 525/74 |
| 3,868,433 | 2/1975 | Bartz et al. | 525/74 |
| 4,046,945 | 9/1977 | Baxmann | 428/282 |

FOREIGN PATENT DOCUMENTS

| 55-13718 | 1/1980 | Japan | 525/78 |

*Primary Examiner*—Ellis P. Robinson
*Attorney, Agent, or Firm*—Wood, Dalton, Phillips, Mason & Rowe

[57] ABSTRACT

Composite structures comprising one or more substrates and an adhesive blend comprising blends of a non-elastomeric graft copolymer of a non-polar ethylene homopolymer or copolymer backbone grafted with at least one grafting monomer comprising one or more of polymerizable ethylenically unsaturated carboxylic acids or the anhydrides of such acids blended with an elastomer-free blending resin that is a mixture of one or more linear low density polyethylenes and one or more polypropylenes.

28 Claims, No Drawings

COMPOSITE STRUCTURES

CROSS REFERENCE TO RELATED APPLICATIONS

This is a continuation-in-part of copending application Ser. No. 313,638 filed Oct. 22, 1981 now abandoned, which is a division of application Ser. No. 178,355 filed Aug. 15, 1980 now abandoned.

BACKGROUND OF THE INVENTION

Composite structures of polypropylene (PP) and polar substrates are finding great utility in industry at the present time. One solution to the problem of securely adhering polypropylene to these polar substrates, like nylon, ethylene-vinyl alcohol copolymers (EVOH), polyvinyl alcohol polymers, metals, glass, or wood, etc., is to blend a polypropylene grafted with an unsaturated carboxylic acid or acid derivative with polypropylene and use this material directly as an adhesive layer between polypropylene and a polar substrate. It would sometimes be preferable to use polyethylene grafted with unsaturated carboxylic acid and acid derivatives because of ease in preparation relative to polypropylene graft copolymers.

If one blends the polyethylene graft copolymers with polypropylene, however, relatively poor adhesion is obtained to polar polymers and other polar substrates. In some instances no adhesion at all is obtained between the graft copolymer blend with polypropylene and the polar substrate. The blends of this invention overcome these difficulties.

SUMMARY OF THE INVENTION

By grafting suitable unsaturated carboxylic acids or acid anhydrides to a non-polar polyethylene backbone and blending the resulting graft copolymer with a blending resin mixture of a polyethylene copolymer made by low pressure polymerization (usually designated as linear low density polyethylene or LLDPE) and a polypropylene we have obtained compositions with excellent adhesive strength to both polypropylene and to various substrates including polar polymers like nylon, ethylene-vinyl alcohol copolymers, polyvinyl alcohol polymers, and other polar surfaces such as metals, glass, cellophane, paper, wood and many others. Each of the graft copolymer, the blending resin mixture, and the polypropylene are non-elastomeric.

DESCRIPTION OF THE PREFERRED EMBODIMENTS

The term polyethylene used herein for the grafting backbone includes non-polar homopolymers of ethylene and non-polar copolymers of ethylene with propylene, butene-1 and other unsaturated aliphatic hydrocarbons. The backbone polymer or copolymer has a density of at least about 0.915. Also it is preferable sometimes to graft the blends of two or more of the above homopolymers and copolymers.

The term polypropylene used herein as part of the blending resin includes non-elastomeric propylene homopolymers and non-elastomeric copolymers of propylene and ethylene, butene and other unsaturated aliphatic hydrocarbons. They are usually prepared using transition metal catalysts. Especially preferable in this invention are propylene homopolymers and propylene copolymers prepared by the so-called block copolymerization process. It is sometimes preferable to use blends of two or more of the above homopolymers or copolymers as the polypropylene component of the blending resin.

The term polyethylene polymers used herein as a blending resin includes non-elastomeric copolymers of ethylene with higher olefins as propylene, butene-1, hexene-1, octene-1, etc. It is sometimes preferable to use blends of two or more of the above copolymers, as the polyethylene component of the blending resin. Preferable ethylene copolymers are those prepared by the low pressure method which produce the so-called linear low density polyethylenes or low pressure low density polyethylenes (LPLDPE). Especially preferable are those linear low density polyethylenes which have narrow molecular weight distribution.

These linear low density polyethylenes have a unique set of properties which distinguish them from both conventional low density polyethylene (LDPE) resins and high density polyethylene resins. Because of the methods by which low density polyethylenes are prepared, they are highly branched materials which have a tendency to coil on themselves and when stretched out snap back and exclude other materials. The linear low density materials, on the other hand, as their name indicates, have very little of this long-chain branching and have on the backbone just short-chain branches introduced by the use of a comonomer. For this reason these polymers have melting points approximately 15°–20° C. higher than those of conventional LDPE resins.

This linear structure allows the polymer to stretch out better and also to blend more easily with other polymers having linear structure like polypropylenes, polyethylenes and polybutene-1, etc. The range of density for linear low density polyethylenes is from about 0.915 to less than 0.94. This distinguishes LLDPE from HDPE which range from 0.94 to 0.97. The structure of the linear low density polyethylenes differs from the high density materials by the fact that they contain considerably more of the comonomer than the high density polyethylene copolymers leading to a high degree of short chain branching. This difference in structure causes their properties to differ from those of HDPE and LDPE.

Linearity leads to good tensile and tear properties while branching yields toughness, puncture resistance and tear strength, low temperature impact, low warpage and excellent environmental stress crack resistance. These differences from conventional low density polyethylene and high density polyethylene have caused LLDPE to be called a third generation of polyethylene—a different material, actually a hybrid with its own set of properties. Because it has its own set of properties, one cannot per se extrapolate and predict the properties of this material, when combined with other polymers, on the basis of the behavior of HDPE or LDPE in blends. Hence, it was surprising to note that these materials, when combined with polyethylene graft copolymers and polypropylene are able to yield properties which are not possible when using LDPE or HDPE combined in the same way with polypropylene and a polyethylene-graft copolymer.

The backbone of the graft copolymers includes non-elastomeric polymers of ethylene and non-elastomeric copolymers of ethylene with higher olefins such as propylene, 1-butene and 1-hexene. Also, it is preferable sometimes to graft to blends of two or more of the above homopolymers and copolymers. While the above polymers represent the preferred embodiments of our invention they should not be regarded as limiting the invention in any way.

The unsaturated carboxylic acids or acid anhydrides used as the grafting monomers include compounds such as acrylic acid, methacrylic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)-non-7-ene, bicyclo(2.2.1)hept-5-ene-2,3-dicarboxylic acid anhydride, x-methylbicyclo(2.2.1) hept-5-ene-2,3-dicarboxylic acid anhydride, maleopimaric acid, tetrahydrophthalic anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof, and the disclosures of which are hereby incorporated by reference.

Cografting monomers as described in U.S. Pat. No. 3,882,194 are also useful for preparing the graft copolymers of this invention.

Included among the conjugated unsaturated esters suitable for cografting are dialkyl maleates, dialkyl fumarates, dialkyl itaconates, dialkyl mesaconates, dialkyl citraconates, alkylacrylates, alkyl crotonates, alkyl tiglates and alkyl methacrylates where alkyl represents aliphatic, aryl-aliphatic and cycloaliphatic groups containing 1-12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, tetrahydrophthalic anhydride, x-methylbicyclo(2.2.1)hept-5-ene-2,3-dicarboxylic acid anhydride and bicyclo(2.2.1)hept-5-ene-2,3-dicarboxylic acid anhydride.

It is often desirable to use more than one monomer in either or both classes of monomers in order to control the physical properties of the final products. The method in general consists of heating a mixture of the polymer or polymers and the monomer or monomers with or without a solvent. The mixture can be heated to above the melting point of the polyolefin with or without a catalyst. Thus, the grafting occurs in the presence of air, hydroperoxides, other free radical catalysts or in the essential absence of those materials where the mixture is maintained at elevated temperatures and (if no solvent is used) preferably under high shear.

The graft and cograft copolymers of this invention are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

Any of the commonly known hydroperoxides which have a half life of at least 1 minute at 145° C. may be used in the method of this invention. Such hydroperoxides have the general formula R—O—OH, wherein R is an organic radical. Among the suitable hydroperoxides are t-butyl hydroperoxide, p-menthane hydroperoxide, pinane hydroperoxide, and cumene hydroperoxide, as well as others known in the art. The elevated temperature causes rapid decomposition of the hydroperoxide which catalyzes the reaction between the polyolefin and monomer to form the graft copolymer.

Obviously, the more homogeneous the mixture prior to heating, the less mixing will be required of the solution or molten composition. Generally, in order to obtain a desirable conversion, it has been found that some form of mixing is highly desirable in the absence of a solvent even when a uniform mixture of all of the components of the composition is formed prior to heating. In general, when a solvent is not used, the composition should be heated to a temperature above about 130° C. and it is preferred to use the temperatures ranging from about 200°-360° C. Temperatures substantially above about 360° C. are generally to be avoided in order to avoid substantial decomposition of the polymeric ingredients. However, if the decomposition products are not undesirable in the product, as in the production of high melt index waxes, higher temperatures may be employed. The reaction time required is quite short, being of the magnitude of from a few seconds to about twenty minutes, although extended heating times do not substantially affect the product and may be employed when desired for any reason.

A convenient method of accomplishing the reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some crosslinking at elevated temperatures, it is desirable to carry out the reaction in a closed vessel. A conventional single or multiple screw extruder accomplishes this result without the use of auxiliary equipment and for this reason is a particularly desirable reaction vessel.

The resulting copolymers of this invention are found to consist of about 70-99.999 weight percent of polyethylene and about 0.001-30 weight percent of the unsaturated acid or acid anhydride or mixtures.

The cograft copolymers of this invention consist of about 50-99.9 weight percent of polyolefin, about 0.05-25 weight percent of the unsaturated acid or acid anhydride or mixtures thereof and about 0.05-25 weight percent of the unsaturated ester and mixtures thereof. These resulting graft copolymers are capable of being blended or reacted with a wide variety of other materials to modify the copolymer further.

The blends of this invention can be used to join polypropylene to a number of polar materials or it can be used to join two polar materials together. The methods for this joining can be lamination, coextrusion, extrusion lamination, coextrusion coating or any other method for joining dissimilar materials known to those skilled in the art. Some of these compositions are polypropylene/adhesive of this invention/nylon, polypropylene/adhesive/ethylene-vinyl alcohol copolymer, polypropylene/adhesive/aluminum, polypropylene/adhesive/steel, polypropylene/adhesive/glass, polypropylene/adhesive/wood, polypropylene/adhesive/leather, polypropylene/adhesive/nylon/adhesive/polypropylene, and polypropylene/adhesive/EVOH/adhesive/polypropylene.

Examples of other metal combinations are aluminum/adhesive/aluminum or adhesive/aluminum/adhesive or polypropylene/adhesive/aluminum/adhesive/polypropylene. Other metals such as copper, steel, brass, etc. can also be used. Dissimilar metal examples are: aluminum/adhesive/copper, aluminum/adhesive/steel, aluminum/adhesive/brass, etc. One could also have combinations in which one has a metal/adhesive/polar polymer. Examples of these would be aluminum/adhesive/nylon or aluminum/adhesive/EVOH, or steel/adhesive/nylon/adhesive/steel. Here again, one skilled in the art can find a number of obvious combinations from the principles described above.

These materials can be used to manufacture many different useful articles. They can be used as packaging film, blow molded bottles, coextruded sheet which can be thermoformed into containers, coatings on glass bottles or wood or metal or even to join two metals, either the same metal or dissimilar metals, into a lamination.

Methods of making the composite structures of the invention include, but are not limited to, blown film coextrusion, cast film coextrusion, blow molding coextrusion, lamination, extrusion or coextrusion coating, powder coating, rotomolding, profile coextrusion or wire coating extrusion or coextrusion.

Blends of the graft copolymers with polypropylene and LLDPE follow the similar procedures as those used in U.S. Pat. Nos. 4,087,587 and 4,087,588, both assigned to the assignee hereof. It is preferred in this invention first to prepare a polyethylene in which an unsaturated monomer is grafted in a high concentration and then the grafted polyethylene can be blended with a wide variety of non-grafted PP and LLDPE so that we can control not only the amount of graft copolymer in the blend but also properties of the blends. The amount of graft copolymer in the blend is determined by the amount required to attain maximum adhesion with the substrate being used.

In preparing the blends in the examples below from the above graft copolymers, polypropylene, ethylene homopolymers and copolymers, any blending equipment or technique may be used. As an example, blends can be prepared in an electrically heated Brabender Plasticorder mixing head using a scroll type mixer under the following conditions: temperature=400° F., rotor speed=120 rpm and mixing time=10 minutes after flux.

All blends contain an antioxidant, e.g. 1,000 ppm tetrakis [methylene 3-(3',5'-di-tert butyl-4'-hydroxyphenyl) proprionate] methane and 2,500 ppm distearyl thiodiproprionate.

In specific examples, the resultant blends were compression molded into films approximately 0.005–0.007 inches thick The films were then heat sealed to the substrate under evaluation at an appropriate temperature and time. These exemplary conditions are for:
1. Nylon 6—430° F. and 2 seconds
2. Ethylene-vinyl alcohol copolymer (EVOH)—430° F. and 5 seconds
3. Polypropylene—500° F. and 5 seconds
4. Aluminum—430° F. and 2 seconds The resultant composites were tested by cutting into strips one inch wide. Adhesion is then tested by a T-peel test similar to that described in ASTM D 1876-72.

EXAMPLE 1

X-methyl bicyclo(2.2.1)hept-5-ene-2,3-dicarboxylic acid anhydride (XMNA) is reacted with a high density polyethylene homopolymer resin in a twin screw extruder to give a graft copolymer resin with 1.5 wt. % XMNA incorporation and a melt index of 1.6 g/10 min. The graft copolymer is blended in varying amounts with a random propylene-ethylene copolymer containing 2% ethylene and having a melt flow rate (MFR) of 2 and a density of 0.900 g/cc. T-peel adhesion results are summarized below:

| Graft Copolymer in Blend (wt. %) | Adhesion to Nylon 6 (lbs/in) |
| --- | --- |
| 3 | 0 |
| 5 | 0 |
| 7 | 0 |
| 10 | 0 |

Adhesion of these blends to polypropylene is excellent (>10 lbs/in)

EXAMPLE 2

Using the same graft copolymer as described in Example 1, blends were prepared with a propylene-ethylene block copolymer containing 5.3% ethylene and having an MFR of 2 and a density of 0.902 g/cc. T-peel adhesion results are summarized below:

| Graft Copolymer in Blend (wt. %) | Adhesion to Nylon 6 (lbs/in) |
| --- | --- |
| 10 | 0.0 |
| 15 | 0.3 |
| 20 | 0.0 |

EXAMPLE 3

The same blends as used in Example 2 were heat sealed to an ethylene-vinyl alcohol copolymer (EVOH). All these blends give extremely poor adhesion to EVOH. The samples could not be tested because they fell apart.

EXAMPLE 4

Ninety percent of a propylene-ethylene block copolymer containing 7.8% ethylene with an MFR of 3.4 was blended with 10 wt. % of the same graft copolymer as described in Example 1. This blend, when heat sealed to EVOH and nylon 6, gives poor heat seal adhesion.

EXAMPLE 5

When 90% of a polypropylene homopolymer having an MFR of 4 blended with 10% of the same graft copolymer as described in Example 1 was heat sealed to EVOH the resultant heat seal adhesion is 0.1 lb/in. If this same blend were heat sealed to a random polypropylene copolymer as described in Example 1, its adhesion is greater than 10 lb/in.

The above examples show that if a polyethylene graft copolymer is blended with a polypropylene homopolymer, a random PP copolymer or a block PP copolymer the adhesion is not satisfactory to polar polymers.

EXAMPLE 6

A blend is prepared of the polypropylene block copolymer of Example 2, a linear low density polyethylene and the graft copolymer described in Example 1. The polypropylene block copolymer 5.3% ethylene, has an MFR of 2 and a density of 0.902. The linear low density polyethylene contains butene-1, has an MI of 3 and a density of 0.922. The adhesion of blends containing various proportions of these materials are tested to nylon 6, EVOH and to a random polypropylene copolymer. The results are shown in Table I.

TABLE I

| PP | LLDPE | Graft Copolymer | Adhesion Nylon 6[1] lb/in | EVOH[2] lb/in | PP[3] lb/in |
|----|-------|-----------------|---------------------------|---------------|-------------|
| 90 | —     | 10              | 0.0                       | 0.1           | >10.0       |
| 65 | 25    | 10              | 2.1                       | 1.2           | >7.4        |
| 50 | 40    | 10              | 3.3                       | 4.3           | 4.8         |
| 45 | 45    | 10              | 3.7                       | 4.5           | 4.4         |
| 40 | 50    | 10              | 4.4                       | 5.9           | 4.2         |
| 25 | 65    | 10              | >8.7                      | 8.6           | 0.5         |
| —  | 90    | 10              | >6.5                      | >8.1          | 0.8         |

[1] 1 mil of nylon 6 is heat sealed to 5–7 mil of the adhesive blend on a heat sealer at a set temperature of 430° F. for 2 sec. The nylon 6 is closest to the heated jaw.
[2] 5–7 mil of the adhesive blend is heat sealed to 5–7 mil of EVOH at a heat sealer set temperature of 430° F. with the following order of layers starting with the upper heated jaw: 3 mil Mylar, adhesive blend, EVOH.
[3] 5–7 mil of adhesive blend is heat sealed to 5–7 mil of PP at a set temperature of 500° F. for 5 sec. with the following order of layers starting with the upper heated jaw: 10 mil Teflon, adhesive blend, PP, 10 mil Teflon.

It can be seen that there is a range of compositions containing <65% polypropylene and >25% polypropylene in which satisfactory adhesion to all three substrates can be obtained.

EXAMPLE 7

Blends containing the same graft copolymer as described in Example 1, the polypropylene block copolymer described in Example 6 and a polyethylene homopolymer made by the high pressure method, having a melt index of 1.8 and a density of 0.922, are prepared. T-peel adhesion to nylon 6, EVOH and the polypropylene random copolymer are shown in Table II.

TABLE II

| PP | LDPE | Graft Copolymer | Adhesion Nylon 6 lb/in | EVOH lb/in | PP lb/in |
|----|------|-----------------|------------------------|------------|----------|
| 90 | —    | 10              | 0.0                    | 0.1        | >10      |
| 65 | 25   | 10              | 2.2                    | 0.6        | >10      |
| 45 | 45   | 10              | 1.8                    | 1.4        | 5.6      |
| 25 | 65   | 10              | —                      | 3.5        | 0.4      |
| —  | 90   | 10              | 4.1                    | —          | 0.0      |

Comparison of the T-peel adhesions obtained in Example 6 to those of Example 7 show that linear low density polyethylenes give far superior adhesion results in comparison to those blends containing ordinary low density polyethylene.

EXAMPLE 8

A blend is prepared containing 45% of the polypropylene block copolymer of Example 2 (MFR=2, density=0.902), 45% of linear low density polyethylene (MI=3, density=0.922) and 10% of the graft copolymer described in Example 1. The blend (5–7 mil) is heat sealed to 1 mil of "A wettability" aluminum at 430° F. and 2 seconds. The T-peel adhesion is 3.4 lb/in.

EXAMPLE 9

Maleic anhydride is reacted with a polyethylene resin in a twin screw extruder to give a graft copolymer resin incorporating maleic anhydride. 10% of this graft copolymer is blended with 45% of the propylene-ethylene block copolymer of Example 2 having an MFR of 2 and 45% of the linear low density polyethylene of Example 6 with a melt index of 3. This material is adhered to various substrates with the following results in T-peel adhesion:

| Substrate | Adhesion lb/in |
|-----------|----------------|
| EVOH      | 6.3            |
| PP        | 3.5            |

EXAMPLE 10

Bicyclo(2.2.1)hept-5-ene-2,3-dicarboxylic acid anhydride is reacted with a high density polyethylene homopolymer resin in a twin screw extruder to give a graft copolymer with about 1.3% incorporation of the unsaturated anhydride. 10 wt. % of this graft copolymer is blended with 45 wt. % of a propylene-ethylene copolymer having an MFR of 2 and 45 wt. % of an LLDPE with a melt index of 3. The T-peel adhesion results are summarized below:

| Substrate | Adhesion lb/in |
|-----------|----------------|
| EVOH      | 7.2            |
| PP        | 2.7            |

EXAMPLE 11

A trilayer composite is prepared by heat sealing at 500° F. for 5 sec. the following layers: nylon 6, a polypropylene adhesive of this invention (10 wt. % of the graft copolymer described in Example 1, 45 wt. % of a block polypropylene copolymer and 45% of a linear low density polyethylene), and a random copolymer of propylene and ethylene. The layers are arranged in the order given, i.e., nylon/adhesive/PP. The adhesion of the nylon to the adhesive layer is 2.7 lb/in with film tear and the adhesion of the adhesive layer to the polypropylene is 3.7 lb/in.

EXAMPLE 12

A similar construction as described in Example 11 was prepared using EVOH in place of polypropylene. The T-peel adhesion obtained to the nylon layer is 2.7 lb/in with tear of the nylon layer, and to EVOH it is 7.5 lb/in with tear of the EVOH layer.

EXAMPLE 13

A construction of three layers was prepared in the heat sealer at 500° F. and 5 sec. using polypropylene/adhesive layer/EVOH as the trilayer composition. The adhesive layer is as described in Example 11. The T-peel adhesion results are:

| Substrate | Adhesion lb/in |
|-----------|----------------|
| PP        | 3.8            |
| EVOH      | 5.1            |

EXAMPLE 14

A trilayer construction of PP/adhesive layer/aluminum was prepared in the heat sealer at 500° F. and 5 sec. The adhesive layer is as described in Example 11. The following T-peel adhesion results were obtained:

| Substrate | Adhesion lb/in |
|---|---|
| PP | 4.0 |
| Aluminum | 4.5 |

EXAMPLE 15

Three blends were prepared comprising 45% of a polypropylene block copolymer containing 5.3% ethylene with an MFR of 2 and a density of 0.902, 10% of the graft copolymer of Example 1, and 45% of an elastomeric ethylene-propylene copolymer, as set forth below:

| | Ethylene-Propylene Copolymers | | |
|---|---|---|---|
| Blend | Ethylene (mole %) | Diene (mole %) | Density |
| 1 | 83 | 3.5 | 0.86 |
| 2 | 64.3 | 3.5 | 0.89 |
| 3 | 55 | 0 | 0.86 |

Each blend was tested for adhesion to various substrates as described. Adhesion results are shown below:

| | Adhesion (lb/in) to | | |
|---|---|---|---|
| Blend | EVOH | Nylon 6 | PP |
| 1 | 0.5 | 1.3 | 11 |
| 2 | 0.2 | 1.3 | 7.5 |
| 3 | 0.0 | — | — |

This Example demonstrates that addition to a blend of an elastomeric ethylene-α-olefin copolymer, such as ethylene-propylene diene or ethylene-propylene having a density of less than 0.91, does not yield a blend having adhesion to polar substrates.

As shown in Examples 16–21 below, and in Examples 1–7 above, excellent adhesion to nylon, ethylene-vinyl-alcohol copolymers and polypropylene, a range of substrates, is obtained when the blend contains linear low density ethylene polymer having a substantial absence of long chain branching and a high degree of short chain branching. These Examples also show that when the linear low density polyethylene is omitted and low density polyethylene used instead, these desirable adhesive results are not obtained with the variety of substrates including the specified nylon, EVOH and polypropylene.

EXAMPLES 16-21

45 wt. % of the nonelastomeric propylene-ethylene block copolymer of Example 2 is blended with 45 wt. % of a low density polyethylene (as listed in the table below) and 10 wt. % of a graft copolymer described in Example #1, above. The adhesions of these materials to EVOH are shown in the table below. The conditions for sealing the films are described above.

| | LDPE | | EVOH |
|---|---|---|---|
| Ex. # | MI g/10 min | Density g/cc | Adhesion lb/in |
| 16 | 1.8 | 0.922 | 1.8 |
| 17 | 3.0 | 0.935 | 1.2 |
| 18 | 2.0 | 0.927 | 1.2 |
| 19 | 2.0 | 0.926 | 1.3 |
| 20 | 3.5 | 0.919 | 0.6 |
| 21 | 1.0 | 0.924 | 1.0 |

EXAMPLES 22 and 23

45 wt. % of a nonelastomeric propylene-ethylene random copolymer containing 2 wt. % ethylene and having an MFR of 2 and a density of 0.900 g/cc is blended with 45 wt. % of a low density polyethylene (as listed in the table below) and 10 wt. % of a graft copolymer as described in Example #1, above. The adhesions of these materials to EVOH are shown in the table below.

| | LDPE | | |
|---|---|---|---|
| Ex. # | MI g/10 min. | Density g/cc | Adhesion lb/in |
| 22 | 3.5 | 0.919 | 2.0 |
| 23 | 2.5 | 0.919 | 0.7 |

EXAMPLES 24-31

45 wt. % of a nonelastomeric polypropylene as described in the table below was blended with 45 wt. % of an LLDPE (MI=3, density=0.921) and 10 wt. % of a graft copolymer as described in Example #1, above, are blended and then tested for adhesion to various substrates. The conditions for adhesion are described above.

| | PP* | | | Adhesion | |
|---|---|---|---|---|---|
| Ex. # | MFR g/10 min | % Ethylene | EVOH | Nylon | PP |
| 24 | 2 | 1.6 | 6.3 | — | 3.7 |
| 25 | 2 | 1.5 | 5.7 | — | 4.0 |
| 26 | 4 | 0 | 5.4 | 3.9 | 4.3 |
| 27 | 5 | 0 | 4.0 | — | 4.8 |
| 28 | 2 | 6 | 6.9 | 4.7 | 4.1 |
| 29 | 2 | 3.9 | 5.5 | — | 3.8 |
| 30 | 4 | 5.4 | 4.8 | — | 5.6 |
| 31 | 5 | 3.9 | 5.9 | — | 6.0 |

*Examples 24–25 utilized random copolymers. Examples 26–27 utilized homopolymers. Examples 28–31 utilized block copolymers.

EXAMPLES 32-39

45 wt. % of an LLDPE as described in the table below was blended with 45 wt. % of a nonelastomeric block propylene polymer as described in the table below and 10 wt. % a graft copolymer as described above and then tested for adhesion to various substrates.

| | LLDPE | | PP | | Adhesion | | |
|---|---|---|---|---|---|---|---|
| Ex. # | MI | Density | MFR | % Ethylene | EVOH | Nylon | PP |
| 32 | 1.6 | 0.920 | 2 | 5.8 | 6.2 | — | 4.6 |
| 33 | 1.6 | 0.920 | 2 | 5.8 | 5.0 | — | 4.4 |
| 34 | 2.3 | 0.917 | 2 | 5.8 | 7.8 | 3.4 | 3.3 |
| 35 | 2.3 | 0.924 | 2 | 5.8 | 7.7 | — | 4.3 |
| 36 | 2.3 | 0.924 | 5 | 3.9 | 4.1 | 2.8 | 6.0 |
| 37 | 2.3 | 0.917 | 1.8 | 7.1 | 4.4 | — | 5.9 |

-continued

| | LLDPE | | PP | | Adhesion | | |
| Ex. # | MI | Density | MFR | % Ethylene | EVOH | Nylon | PP |
|---|---|---|---|---|---|---|---|
| 38 | 2.3 | 0.917 | 5.0 | 3.9 | 4.3 | — | 6.1 |
| 39 | 2.3 | 0.917 | 4.0 | 5.4 | 5.3 | — | 4.0 |

As can be seen from the foregoing Examples, the inclusion of linear low density polyethylene as defined above produces better adhesion on a wider variety of substrates than is achieved with the same blends by using low density polyethylene instead of the linear low density polyethylene of this invention. In particular, adhesion to both polypropylene and polar substrates is achieved.

EXAMPLE 40

A blend was prepared containing 45 wt. % of a block propylene copolymer, 45 wt. % of a linear low density ethylene copolymer and 10 wt. % of the graft copolymer described in Example 1. The block propylene copolymer contained 5.3% ethylene and had an MFR of 2 g/10 min. and a density of 0.902 g/cc. The ethylene copolymer contained butene-1 and had a melt index of 2 g/10 min and a density of 0.918 g/cc. This blend was coextruded with an ethylene vinyl alcohol copolymer containing 62 mole % vinyl alcohol and having a melt index of 3.5 g/10 min. The adhesion between the layers was 0.8 lb/in.

EXAMPLE 41

The blend of Example 40 was coextruded with the block propylene copolymer described in Example 40. The adhesion between the layers was 3.7 lb/in.

EXAMPLE 42

A blend was prepared using 42 wt. % of the block propylene-ethylene copolymer described in Example 40, 42 wt. % of the linear low density ethylene copolymer described in Example 40 and 16 wt. % of the graft copolymer described in Example 1. This material was coextruded with nylon 6. The coextrusion contained 2.3 mils of the adhesive and 1.7 mils of nylon 6. The adhesion between the layers was 1.9 lb/in.

EXAMPLE 43

The blend described in Example 42 was coextruded with the block propylene copolymer described in Example 40. The total thickness of the coextrusion was 4.2 mil. The adhesion between the two layers was greater than 4.7 lb/in.

EXAMPLE 44

The blend described in Example 42 was coextruded with the ethylene-vinyl alcohol copolymer described in Example 40 to yield a coextrudate containing 2.0 mil of the adhesive blend and 1.8 mil of the ethylene-vinyl alcohol copolymer. Adhesion between the two layers was 1.2 lb/in.

| Glossary of Terms | |
|---|---|
| EVOH | ethylene-vinyl alcohol copolymer |
| HDPE | high density polyethylene |
| LDPE | low density polyethylene |
| LLDPE | linear low density polyethylene |
| LPLDPE | low pressure low density polyethylene |
| MFR | melt flow rate, ASTM D 1238, condition L |
| MI | melt index, ASTM D 1238, condition E |
| PP | polypropylene |
| XMNA | x-methylbicyclo (2.2.1) hept-5-ene-2,3-dicarboxylic acid anhydride |

Having described our invention as related to the embodiments set out herein, it is our intention that the invention not be limited by any of the details of description, unless otherwise specified, but rather be construed broadly within its spirit and scope as set out in the appended claims.

We claim:

1. A composite structure comprising:
   (A) a substrate, and adhered thereto
   (B) a modified polyolefin blend consisting essentially of about 0.1–40 parts by weight in said blend of a non-elastomeric graft copolymer of about 70–99.999 wt. % of a non-polar ethylene homopolymer or copolymer backbone having a density of at least about 0.915 grafted with about 30–0.001 wt. % of at least one grafting monomer comprising at least one polymerizable ethylenically unsaturated carboxylic acid or carboxylic acid anhydride for a total of 100% and about 99.9–60 parts by weight of a substantially elastomer free blending resin mixture of about 25–75 wt. % of a linear low density polyethylene of a density of about 0.915 to less than 0.94, having a substantial absence of long-chain branching and a high degree of short-chain branching, and about 75–25 wt. % of a non-elastomeric polypropylene for a total of 100%.

2. The composite structure of claim 1 wherein said substrate comprises polar polymers, polypropylene, solid metals, glass, paper, wood or cellophane.

3. The composite structure of claim 1 wherein said substrate comprises nylon.

4. The composite structure of claim 1 wherein said substrate comprises aluminum.

5. The composite structure of claim 1 wherein said substrate comprises ethylene-vinyl alcohol copolymer.

6. The composite structure of claim 1 wherein said polypropylene of the blending resin comprises a copolymer of propylene and ethylene.

7. The composite structure of claim 1 wherein said substrate comprises propylene homopolymers and copolymers of propylene and one or more unsaturated aliphatic hydrocarbons.

8. The composite structure of claim 7 wherein said hydrocarbon comprises ethylene.

9. The composite structure of claim 1 wherein said polypropylene of the blending resin comprises propylene homopolymers and copolymers of propylene and one or more unsaturated aliphatic hydrocarbons.

10. The composite structure of claim 1 wherein said linear low density polyethylene has a narrow molecular weight distribution.

11. The composite structure of claim 1 wherein said polyethylene of the blending resin comprises copolymers of ethylene and an unsaturated hydrocarbon.

12. The composite structure of claim 11 wherein said hydrocarbon comprises propylene, butene-1, hexene-1 or octene-1.

13. The composite structure of claim 1 wherein said grafting monomer comprises at least one of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2, 3-dicarboxylic acid anhydride, maleopimaric acid, tetrahydrophthalic anhydride, norborn-5-ene-2, 3-dicarboxylic acid anhydride, Nadic anhydride, methyl Nadic anhydride, Himic anhydride, methyl Himic anhydride, and x-methyl bicyclo(2.2.1)-hept-5-ene-2, 3-dicarboxylic acid anhydride.

14. The method of making the composite structure of claim 1 wherein said components are adhered together by methods including blown film coextrusion, cast film coextrusion, blow molding coextrusion, lamination, coextrusion coating, powder coating, rotomolding, profile coextrusion or wire coating extrusion or coextrusion.

15. A composite structure comprising:
(A) two or more substrates with adjacent pairs adhered together by
(B) an intervening layer of a modified polyolefin blend consisting essentially of about 0.1–40 parts by weight in said blend of a non-elastomeric graft copolymer of about 70–99.999 wt. % of a non-polar ethylene homopolymer or copolymer backbone having a density of at least about 0.915 grafted with about 30–0.001 wt. % of at least one grafting monomer comprising at least one polymerizable ethylenically unsaturated carboxylic acid or carboxylic acid anhydride for a total of 100% and about 99.9–60 parts by weight of a substantially elastomer-free blending resin mixture of about 25–75 wt. % of a linear low density polyethylene of a density of about 0.915 to less than 0.94, having a substantial absence of long-chain branching and a high degree of short-chain branching, and about 75–25 wt. % of a non-elastomeric polypropylene for a total of 100%.

16. The composite structure of claim 15 wherein said (A) comprises polypropylene and a polar substrate.

17. The composite structure of claim 15 wherein said (A) comprises polypropylene and nylon.

18. The composite structure of claim 15 wherein said (A) comprises polypropylene and ethylene-vinyl alcohol copolymer.

19. The composite structure of claim 25 wherein said (A) comprises polypropylene and aluminum.

20. The composite structure of claim 15 wherein said (A) comprises polar substrates.

21. The composite structure of claim 15 wherein said polypropylene of the blending resin comprises propylene homopolymers and copolymers of propylene and one or more unsaturated aliphatic hydrocarbons.

22. The composite structure of claim 21 wherein said hydrocarbon comprises ethylene.

23. The composite structure of claim 15 wherein said polypropylene of the blending resin comprises a copolymer of propylene and ethylene.

24. The composite structure of claim 15 wherein said linear low density polyethylene has a narrow molecular weight distribution.

25. The composite structure of claim 15 wherein said polyethylene of the blending resin comprises copolymers of ethylene and an unsaturated hydrocarbon.

26. The composite structure of claim 25 wherein said hydrocarbon comprises propylene, butene-1, hexene-1 or octene-1.

27. The composite structure of claim 15 wherein said grafting monomer comprises at least one of acrylic acid, methacrylic acid, maleic acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methyl bicyclo(2.2.1)hept-5-ene-2,3-dicarboxylic acid anhydride.

28. The method of making the composite structure of claim 15 wherein said components are adhered together by methods including blown film coextrusion, cast film coextrusion, blow molding coextrusion, lamination, coextrusion coating, powder coating, rotomolding, profile coextrusion or wire coating extrusion or coextrusion.

* * * * *